(12) United States Patent
Schiff et al.

(10) Patent No.: US 7,633,895 B2
(45) Date of Patent: Dec. 15, 2009

(54) ORTHOGONAL CODE DIVISION MULTIPLE ACCESS ON RETURN LINK OF SATELLITE LINKS

(75) Inventors: Leonard N. Schiff, San Diego, CA (US); Ahmad Jalali, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 306 days.

(21) Appl. No.: 10/428,953

(22) Filed: May 1, 2003

(65) Prior Publication Data

US 2004/0037238 A1 Feb. 26, 2004

Related U.S. Application Data

(60) Provisional application No. 60/391,438, filed on Jun. 24, 2002.

(51) Int. Cl.
*H04B 7/212* (2006.01)
(52) U.S. Cl. ............. 370/321; 370/320; 370/316; 370/342; 370/305; 375/1; 375/147; 375/200
(58) Field of Classification Search ........... 370/320, 370/316, 342, 204, 350, 305; 375/147, 1, 375/200
See application file for complete search history.

(56) References Cited

U.S. PATENT DOCUMENTS

| 5,216,692 | A | * | 6/1993 | Ling | 375/130 |
| 5,235,615 | A | * | 8/1993 | Omura | 370/342 |
| 5,305,468 | A | * | 4/1994 | Bruckert et al. | 455/69 |
| 5,481,561 | A | * | 1/1996 | Fang | 370/320 |
| 5,590,409 | A | * | 12/1996 | Sawahashi et al. | 455/69 |
| 5,710,982 | A | * | 1/1998 | Laborde et al. | 455/69 |
| 5,771,229 | A | * | 6/1998 | Gavrilovich | 370/342 |
| 5,835,847 | A | * | 11/1998 | Gilmore et al. | 455/12.1 |
| 5,867,525 | A | * | 2/1999 | Giallorenzi et al. | 375/145 |
| 5,907,813 | A | * | 5/1999 | Johnson et al. | 455/502 |
| 5,918,155 | A | * | 6/1999 | Nakamura et al. | 455/12.1 |
| 5,974,315 | A | * | 10/1999 | Hudson | 455/427 |
| 5,991,279 | A | * | 11/1999 | Haugli et al. | 370/311 |
| 6,108,317 | A | * | 8/2000 | Jones et al. | 370/320 |
| 6,151,328 | A | * | 11/2000 | Kwon et al. | 370/441 |
| 6,212,360 | B1 | * | 4/2001 | Fleming et al. | 455/13.4 |

(Continued)

FOREIGN PATENT DOCUMENTS

EP 1091506 5/2001

*Primary Examiner*—Ayaz R Sheikh
*Assistant Examiner*—Andrew C Lee
(74) *Attorney, Agent, or Firm*—Turocy & Watson, LLP

(57) ABSTRACT

Orthogonal CDMA (OCDMA) in the return link of a satellite based communications system provides improved bandwidth efficiencies; increased ability to overcome channel degrading phenomenon; reduced transmission power; or various combinations thereof. By achieving code synchronization needed for advantageous use of OCDMA in the return link of a satellite based communication system, a plurality of terminals, each with a unique time slot/code channel assignment, may transmit concurrently, with the same, or lower, aggregate power as would be used by a single terminal using TDMA. Use of OCDMA in the return link allows one or more terminals, each in a common beam and assigned a common time slot, to transmit at a higher transmission power to overcome channel degradation effects. The ability to allow for higher transmission power for a particular terminal can increase the effective data rate for that terminal by enabling the use of a higher order modulation technique.

21 Claims, 4 Drawing Sheets

U.S. PATENT DOCUMENTS

| | | | | |
|---|---|---|---|---|
| 6,222,828 B1* | 4/2001 | Ohlson et al. | ............... | 370/320 |
| 6,226,316 B1* | 5/2001 | Schilling et al. | ............ | 375/142 |
| 6,285,655 B1* | 9/2001 | Lundby et al. | ............... | 370/209 |
| 6,317,412 B1 | 11/2001 | Natali et al. | ................. | 370/208 |
| 6,356,595 B1* | 3/2002 | Czaja et al. | ................. | 375/262 |
| 6,373,834 B1* | 4/2002 | Lundh et al. | ................ | 370/350 |
| 6,396,804 B2* | 5/2002 | Odenwalder | ................ | 370/209 |
| 6,430,418 B1* | 8/2002 | Nivens et al. | ............... | 455/522 |
| 6,516,007 B1* | 2/2003 | Hong et al. | ................. | 370/515 |
| 6,542,480 B1* | 4/2003 | Campanella | ................ | 370/324 |
| 6,542,536 B1* | 4/2003 | Hershey et al. | ............. | 375/130 |
| 6,545,990 B1* | 4/2003 | Amalfitano et al. | ......... | 370/335 |
| 6,631,124 B1* | 10/2003 | Koorapaty et al. | .......... | 370/337 |
| 6,643,318 B1* | 11/2003 | Parsa et al. | ................. | 375/141 |
| 6,674,730 B1* | 1/2004 | Moerder | ...................... | 370/316 |
| 6,714,760 B2* | 3/2004 | Robinett | .................. | 455/3.02 |
| 6,731,614 B1* | 5/2004 | Ohlson et al. | ............... | 370/320 |
| 6,763,058 B1* | 7/2004 | Morris | ....................... | 375/141 |
| 6,771,642 B1* | 8/2004 | Seaver et al. | ................ | 370/360 |
| 6,816,473 B2* | 11/2004 | Ozluturk et al. | ............. | 370/335 |
| 6,917,607 B1* | 7/2005 | Yeom et al. | .................. | 370/342 |
| 6,963,754 B2* | 11/2005 | Masuda et al. | .............. | 455/522 |
| 6,996,056 B2* | 2/2006 | Chheda et al. | .............. | 370/209 |
| 7,046,719 B2* | 5/2006 | Chen et al. | .................. | 375/147 |
| 7,120,132 B2* | 10/2006 | Choi et al. | ................... | 370/324 |
| 7,142,521 B2* | 11/2006 | Haugli et al. | ............... | 370/320 |
| 7,215,653 B2* | 5/2007 | Kim et al. | .................... | 370/329 |
| 7,315,536 B2* | 1/2008 | Koorapaty | ................... | 370/350 |
| 2001/0012785 A1* | 8/2001 | Esteves et al. | ............. | 455/522 |
| 2001/0036200 A1* | 11/2001 | Nelson et al. | ............... | 370/503 |
| 2002/0105929 A1* | 8/2002 | Chen et al. | .................. | 370/335 |
| 2002/0141367 A1* | 10/2002 | Hwang et al. | ............... | 370/335 |
| 2002/0150065 A1* | 10/2002 | Ponnekanti | ................. | 370/334 |
| 2003/0050072 A1* | 3/2003 | Noerpel et al. | .............. | 455/452 |
| 2003/0076812 A1* | 4/2003 | Benedittis | .................. | 370/350 |
| 2003/0076872 A1* | 4/2003 | Jalloul et al. | ................ | 375/141 |
| 2003/0134654 A1* | 7/2003 | Masuda et al. | .............. | 455/522 |
| 2005/0208961 A1* | 9/2005 | Willenegger | ................ | 455/522 |

* cited by examiner

ORTHOGONAL CODE DIVISION MULTIPLE ACCESS ON RETURN LINK OF SATELLITE LINKS

CROSS-REFERENCE TO RELATED APPLICATION

This application claims the benefit of priority of U.S. Provisional Patent Application Ser. No. 60/391,438, filed Jun. 24, 2002, which application is incorporated herein by reference.

BACKGROUND OF THE INVENTION

I. Field of the Invention

The present invention relates generally to wireless communication systems, and more particularly to methods and apparatus for providing improved bandwidth utilization of a return link in satellite communication systems by access terminals using an orthogonal code division multiple access approach in the return link.

II. Background

Various satellite communication systems have been developed over the years. One early system architecture is referred to as Time Division Multiple Access (TDMA) and is characterized by assignment of time slots in a communication channel to each of a plurality of terminals, and with communication with the terminals taking place in the specifically assigned time slots. An improved system architecture is referred to as Code Division Multiple Access (CDMA). CDMA based communication systems generally provide greater bandwidth efficiency than do TDMA based communication systems. Many CDMA based satellite communication systems typically operate in a CDMA mode in the forward link (FL) direction and in a TDMA mode in the return link (RL) direction.

There are two main modes of CDMA, asynchronous CDMA and synchronous orthogonal CDMA. In the asynchronous mode of CDMA operation, the signals from different terminals are not synchronized and, therefore, cause interference to each other. In the synchronous mode of operation, the transmission signals from different terminals are timed such as to arrive synchronously at the receiver. In the synchronous mode of CDMA, if orthogonal codes are used to distinguish different terminal transmissions, then there is no cross-interference among the different signals received from terminals. In this case, one achieves higher bandwidth efficiency due to reduced interference. On the forward link, orthogonality among different codes is maintained because all signals originate at the same location, namely at the gateway. On the return link, however, without a synchronization mechanism, signals from different terminals arrive asynchronously at the gateway due to the their different propagation delays. What is needed are methods and apparatus for operating an orthogonal CDMA based return link for satellite communication systems.

SUMMARY OF THE INVENTION

A method is disclosed for operating an access terminal, by transmitting a reference signal to a gateway; and receiving a message assigning a time slot, a code channel for transmission, a transmit time adjustment instruction, a transmit power instruction, and a date rate instruction, with the transmit power instruction being based, at least in part, on a location of the access terminal with respect to a beam center.

In other embodiments, a message can be transmitted to the gateway indicating an amount of data that is to be transmitted from the access terminal; and the transmit power instruction is based, at least in part, on the amount of data that is to be transmitted from the access terminal. The transmit time adjustment instruction can be based, at least in part, on a location of the access terminal with respect to the beam center. Furthermore, a Walsh code modulated message can be transmitted to the gateway using the return link during a time slot specified by the time slot assignment, at a transmit power specified by the transmit power instruction, and at a data rate specified by the data rate instruction.

In another embodiment, prior to transmitting at least a portion of the amount of data that is to be transmitted, the transmit time is adjusted so as to achieve code synchronicity, a signal is code modulated in accordance with the code channel assigned to the access terminal, and at least a portion of the amount of data that is to be transmitted is transmitted at the transmit power level specified by the transmit power instruction.

In further aspects, a degradation in channel conditions is detected, such as due to rain fade, and the transmit power is increased to compensate for the degradation in channel conditions.

In a further embodiment, a method for operating a communication system is disclosed comprising receiving, a message from an access terminal at a gateway, determining the channel conditions between the gateway and the access terminal, and determining, at the gateway, a received signal strength of the received message. A timing offset of the received message is then determined at the gateway and a time slot assignment, a code channel assignment, a transmit time adjustment instruction; a transmit power instruction, and a data rate instruction are transmitted to the access terminal.

This can be accomplished or repeated for a plurality of access terminals; wherein the time slot assignment transmitted to each of the plurality of access terminals is the same. Therefore, a plurality of code modulated messages can be received during the time slot specified by the time slot assignment, and they can be dispread in parallel.

A receiver is disclosed having a downconverter coupled to an A/D converter with a plurality of despreaders, each having an input terminal coupled to the A/D converter, and each despreader further having an output terminal with a plurality of data demodulators, each having an input terminal coupled to a corresponding despreader output terminal.

In further embodiments, the plurality of despreaders each comprise a Walsh despreader, and each of the plurality of Walsh despreaders can be coupled to a Walsh code source. The Walsh code source can be coupled to a bus with each of the plurality of Walsh despreaders also coupled to the bus. Each of the plurality of Walsh despreaders includes at least one stored Walsh code.

A gateway is disclosed having a code source coupled to at least one code modulator, and to a plurality of despreaders with an upconverter coupled to the at least one code modulator, and further coupled to an antenna. A downconverter is coupled to the antenna, and further coupled to the plurality of despreaders, and a plurality of demodulators is each coupled to a corresponding one of the despreaders. The plurality of despreaders can each comprise a Walsh despreader with the code source being a source of orthogonal Walsh codes. Briefly, embodiments of the present invention provide improved bandwidth efficiencies; increased ability to overcome rain fade, or other channel degrading phenomenon; reduced transmission power; or various combinations thereof. By advantageous use of orthogonal CDMA in the return link of a geosynchronous satellite based communication system, embodiments of the present invention permit a plurality of access terminals, each with a unique time slot/code channel assignment, to transmit concurrently in a beam, with the same, or lower, aggregate power as would be used by a single access terminal using TDMA as its access method. Advantageous use of orthogonal CDMA in the return link allows one or more access terminals, each in a common beam and assigned a common time slot, to transmit at a higher transmission power to overcome channel degradation effects such as those due to rain fade. The ability to allow for higher transmission power for a particular terminal can be used to increase the effective data rate for that terminal by enabling the use of a higher order modulation technique. In this manner, one effectively increases the total transmit power on the RL without increasing the peak power requirement of the terminals' power amplifiers, thereby increasing the total RL throughput for the same terminal peak transmit power limit as in the TDMA system.

BRIEF DESCRIPTION OF THE DRAWINGS

The features, objects, and advantages of the present invention will become more apparent from the detailed description set forth below when taken in conjunction with the drawings in which like reference characters identify the same or similar elements throughout and wherein.

DETAILED DESCRIPTION

Figure 1:
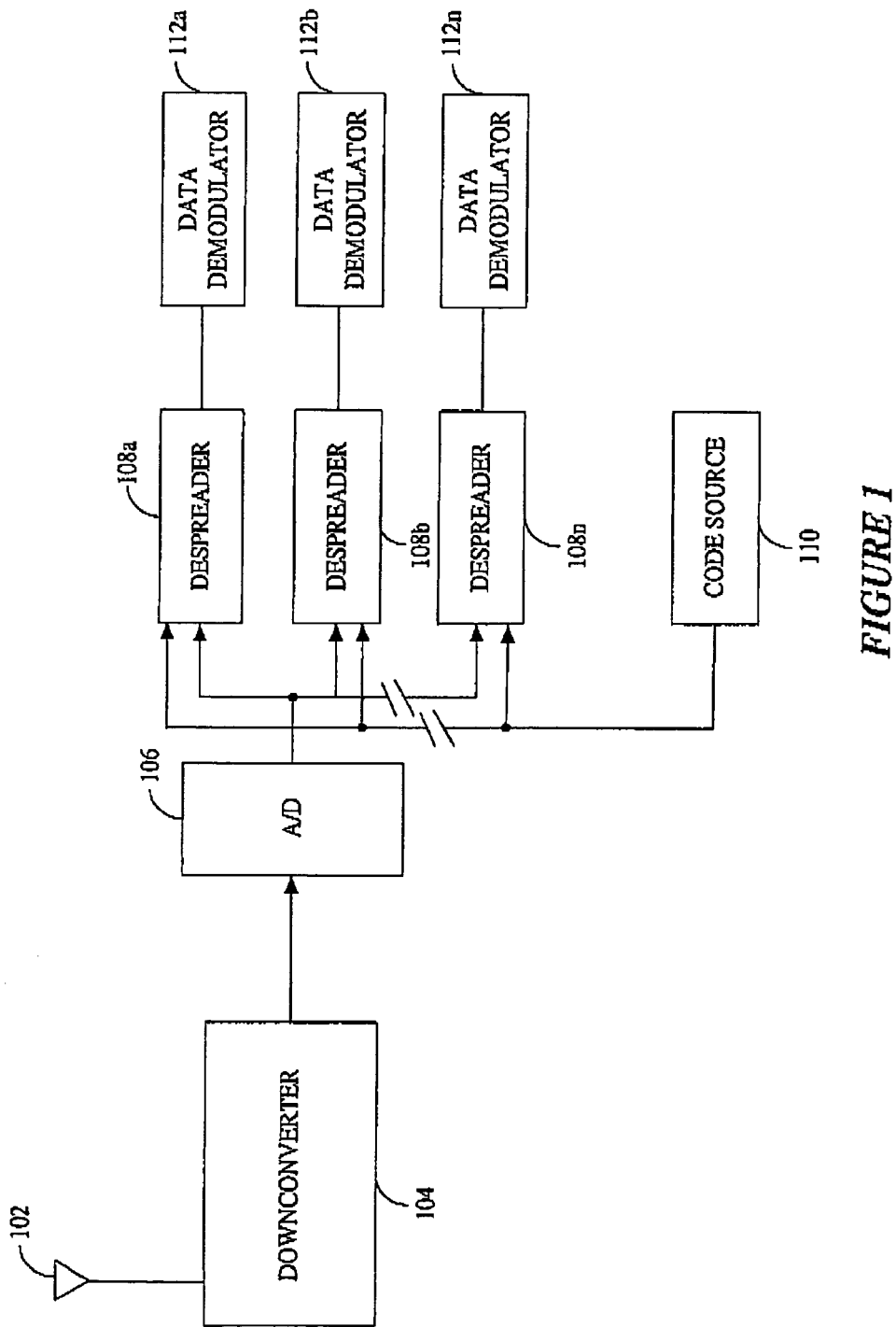
FIG. 1 is a block diagram representation of a receiver for receiving a plurality of concurrent CDMA transmissions on the return link from a corresponding plurality of terminals.

Generally, embodiments of the present invention provide improved bandwidth efficiencies, increased ability to overcome rain fade or other channel degrading phenomenon, reduced transmission power, or various combinations thereof. More particularly, by advantageous use of orthogonal CDMA in the return link of a geosynchronous satellite based communication system, embodiments of the present invention permit a plurality of access terminals, each with a unique time slot/code channel assignment, to transmit concurrently in a beam, with the same or lower aggregate power as would be used by a single access terminal using TDMA as its access method. In other embodiments of the present invention, advantageous use of orthogonal CDMA in the return link allows one or more access terminals, each in a common beam and assigned a common time slot, to transmit at a higher transmission power to overcome channel degradation effects such as those due to rain fade. Alternatively, the ability to provide higher transmission power can be used to increase the effective data rate for a terminal by enabling the use of a higher order modulation technique.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well-known features are omitted or simplified in order not to obscure the present invention.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Terminology

Forward Link Data Rate Control, as used herein, refers to the index of the maximum decodable data rate, which is the maximum data rate that an access terminal can decode as determined by one or more measurements of the signal-to-noise ratio on the forward link of a satellite system.

Terminals, or user terminals, are also sometimes referred to as access terminals, subscriber units, mobile units, mobile stations, or simply "users," "mobiles," or "subscribers" in some communication systems, depending on preference. These terms are well understood in this field.

In an illustrative satellite communications system, the bandwidth that is made available for communication between access terminals and a gateway is divided into four channels. Those four channels are referred to herein as the heartbeat channel, the deterministic reservation channel, the statistically multiplexed channel, and the random access channel. The function of these channels is described next with particular attention to how these channels are used by the access terminals.

With respect to the random access channel, access terminals send their initial packets on the random access channel to activate the physical layer. This initial packet may include a request for bandwidth on the deterministic reservation channel and/or the statistically multiplexed reservation channel on the return link. The random access channel may also be used by access terminals to send short packets in order to avoid the delays that may be associated with requesting bandwidth on the reservation channels. The random access channel is an asynchronous CDMA channel.

The deterministic reservation channel is divided into multiple time slots. In various embodiments, the deterministic reservation channel is also divided into code channels. The access terminals obtain a time slot/code channel reservation on the deterministic reservation channel by explicitly making a request for bandwidth. The gateway may grant such a request by sending a channel assignment message to the access terminals on the forward link (FL). In this way, a unique time slot/code channel assignment can be provided to each of many access terminals.

The heartbeat channel is divided into short time slots/code channels. Each access terminal is assigned a time slot/code channel on the heartbeat channel. The heartbeat channel provides a communication pathway useful for determining the channel conditions between the gateway and the various access terminals. First, the heartbeat channel provides a feedback channel by which the access terminals may send their channel conditions to the gateway. Second, the heartbeat channel also provides a reference signal by which the gateway may measure received signal-to-noise ratio on the return link. By measuring the received SNR on the return link, the gateway is able to determine the maximum data rate that the access terminal may transmit over the return link for a given transmit power. Furthermore, access terminals measure the received signal-to-noise ratio on the forward link and determine the maximum data rate that they may correctly decode.

Access terminals send the index of the maximum decodable data rate, referred to as the FL-DRC (Forward Link Data Rate Control) to the gateway on the heartbeat channel. The gateway transmits data to the access terminals at the data rate specified in the message sent by the access terminals on the heartbeat channel. Therefore, the heartbeat channel provides feedback to the gateway regarding the channel conditions presently available to the access terminals. The data sequence sent on the heartbeat channel time slot/code channel is also used by the gateway to estimate a time offset between the access terminal and the gateway. As described below, this time offset estimate is used to adjust the transmission time for access terminals to achieve code synchronization among return link transmissions from different access terminals. The gateway also uses the signal on the heartbeat channel to estimate received signal strength (RSS) on the return link for each access terminal to provide what is referred to as a received signal strength indication (RSSI). The transmission power and data rate of the access terminals are determined, at least in part, based upon the RSSI information.

The bandwidth on the statistically multiplexed (STAT-MUX) channel is divided into a number of orthogonal code channels. Each code channel is assigned to an active terminal for a certain time duration. A number of methods may be used to specify the length of the time the code channel is assigned to a certain terminal. In one embodiment, the terminal maintains the code channel until such time that the code channel has been idle for more than a pre-selected time interval, at which time the code channel is relinquished to the gateway to be assigned to another terminal.

One type of code suitable for generating the statistically multiplexed reservation channel is a Walsh code. At least one unique Walsh code is assigned to each of a plurality of access terminals which are permitted to transmit substantially simultaneously. That is, each active access terminal is assigned a Walsh code on the statistically multiplexed reservation channel. The statistically multiplexed reservation channel code channel assignment is maintained for the access terminals that are "actively" exchanging data with the gateway. In other words, each active access terminal is assigned a certain amount of bandwidth on the statistically multiplexed reservation channel of the return link. It is noted that some of the access terminals may not fully utilize their allocated bandwidth on the statistically multiplexed reservation channel. Therefore, some of the bandwidth on the statistically multiplexed reservation channel is wasted. However, as will be described below, the statistical nature of the bandwidth usage on the statistically multiplexed reservation channel may be used, in accordance with the present invention, to improve the efficiency of the statistically multiplexed reservation channel.

It is noted that orthogonal CDMA is an access method that is known and used for the forward link of satellite communication systems, but not for the return link. However, methods and apparatus for use of orthogonal CDMA in the return link are disclosed in a U.S. Provisional Patent Application Ser. No. 60/391,437, entitled "Orthogonal CDMA In Return Direction," filed on Jun. 24, 2002, which application is incorporated herein by reference, and is assigned to the assignee of this application. In general, the transmissions of the access terminals on the return link of a geo-stationary satellite system may be synchronized through control signaling sent to the access terminals by the gateway. The gateway uses the transmissions from access terminals on the return link to determine the time offset that each access terminal must introduce prior to an orthogonal CDMA transmission so that the signals from all access terminals arrive at the gateway with Walsh code synchronization.

In one embodiment, the gateway uses the data sequence on the heartbeat channel to estimate the time offset between the received sequence and a desired reference time. In addition to timing synchronization (i.e., code phase synchronization), the frequency offset between the transmitter of the access terminal and the receiver of the gateway must also be made small enough so that the phase change of the signal over the period of one orthogonal code is negligible. In one method for achieving frequency synchronization between an access terminal and the gateway, the access terminal adjusts the frequency of its oscillator so as to lock to the frequency of the signal received from the gateway.

It is noted that the synchronization mechanism described above is designed to synchronize the signal arrivals at the Walsh code boundary, where those signals originate with different access terminals. Once synchronization on the return link among different access terminals is achieved, one may multiplex data from multiple users using Walsh codes. Each access terminal is assigned a specific Walsh code on the return link. Since the transmission times of the data for different access terminals on the return link are adjusted to arrive Walsh code synchronously at the gateway, orthogonality among different access terminals' codes is maintained at the receiver on the return link.

It is noted that greater bandwidth efficiency may be obtained with the use of orthogonal CDMA as compared to TDMA. In one embodiment, the return link bandwidth efficiency of the deterministic reservation channel may be increased using OCDMA compared to a TDMA approach as is described below.

First, consider an illustrative example in which a reservation based multiple access technique where each access terminal is assigned a dedicated time slot on the return link in a TDMA manner. The access terminals transmit their data during the specific time slots assigned to them by the gateway. The gateway may use the forward link control channel to send reservation vectors to the access terminals. During the return link time slot the gateway is able to determine channel conditions seen by the access terminals and to make RSSI estimates based, at least in part, on one or more reference signals sent to the gateway by the access terminal. Such RSSI is used to develop rate and power control information for the access terminals. An access terminal may then transmit at the maximum power and at the maximum data rate at which the gateway is able to correctly decode the data received from the access terminal. The data rate at which the access terminal may transmit depends, at least in part, on the location of the access terminal in a given beam. In a more specific illustrative example, the gateway measures the signal strength received from each access terminal on the heartbeat channel, and, based at least in part on this measurement, determines the maximum rate at which the access terminal may transmit on the return link at a given power level. The gateway then sends to the access terminal, over the forward link, information referred to as the Return Link Data Rate Control (return link-DRC). The access terminals transmit at the data rate specified by the return link-DRC sent to them by the gateway.

The access terminal in the center of a beam may transmit at the highest provisioned rate because the antenna gain for access terminals located at the center of the beam is the highest. However, an access terminal at the edge of the beam sees a lower antenna gain (4 dB lower in this illustrative example) and its received signal power at the gateway is lower. Therefore, the access terminals at the edge of the beam are required to transmit their data at a lower rate. In other words, the bandwidth efficiency of an access terminal depends on its location within the beam. The bandwidth efficiency is highest for access terminals at the beam center and lowest for access terminals at the beam edge. In order to provide an equal data rate to all access terminals under these circumstances, more time must be assigned to access terminals that are located away from the center of the beam, and this is particularly the case for those access terminals located at the edge of the beam (i.e., farthest from the center of the beam). Unfortunately, assigning, or allocating, more time to those access terminals located away from the center of the beam reduces the overall throughput of the beam. For example, the access terminal in the center of the beam can transmit at a bandwidth efficiency of 1.5 bits/sec/Hz whereas an access terminal on the beam edge can transmit at about 0.75 bits/sec/Hz because the signal power received at the gateway is about 4 dB lower than that of an access terminal at the center of the beam. By using OCDMA, in accordance with the present invention, the bandwidth efficiency of an access terminal at the beam edge can be increased so that it generally matches that of an access terminal at the center of the beam, i.e., 1.5 bits/sec/Hz.

With respect to an OCDMA return link in accordance with the present invention, L users are each assigned a unique orthogonal Walsh code. Each user sends one data modulation symbol during each Walsh code interval. In other words, each access terminal repeats a data modulation symbol L times over the period of its assigned Walsh code resulting in a processing gain of L. Let $(E_b/N_t)_{TDMA}$ denote the energy per bit measured in a TDMA based system for a given coding and modulation scheme. Then, if each access terminal in the OCDMA system, transmits at its maximum available power, the $E_b/N_t$ received on the OCDMA channel for one access terminal on the return link, denoted by $(E_b/N_t)_{OCDMA}$, is given by:

$$(E_b/N_t)_{OCDMA} = L(E_b/N_t)_{TDMA}$$

In other words, for the same transmit power at the access terminal, the achievable $E_b/N_t$ is L times greater on the OCDMA channel than on the TDMA channel due to the processing gain of OCDMA. Therefore, one may use a higher order modulation in the case of OCDMA and thereby achieve higher bandwidth efficiency than in the TDMA approach. Note that in OCDMA each access terminal effectively has 1/Lth of the bandwidth that one access terminal in the TDMA system has. That is, the data rate on one OCDMA channel is, for the same modulation/coding choice, L times lower than on the TDMA channel. However, based on the above discussion, it can be seen that since, for the same transmit power a higher order modulation/coding scheme may be used for an OCDMA access terminal, the bandwidth efficiency of OCDMA is greater.

It is noted that if 1/Lth of the maximum available transmit power were sent in the case of OCDMA, then the achieved $E_b/N_t$ for the OCDMA access terminal would be the same as that of the TDMA approach. In practice, one may choose the transmit power of the OCDMA access terminal with code length of L to be between the maximum available transmit power and 1/Lth of the maximum available transmit power. By choosing the transmit power, in accordance with the embodiments, the bandwidth efficiency for the access terminal is adjusted accordingly. For example, the access terminals at the center of the beam may transmit at 1/Lth of the maximum available transmit power and still transmit data at the highest bandwidth efficiency (1.5 bits/sec/Hz in this illustrative embodiment) because their achieved $E_b/N_t$ has not changed as compared to the TDMA system. Whereas an access terminal at the beam edge may choose a transmit power between the maximum available and 1/Lth of the maximum available power.

In one embodiment, the transmit power level is chosen so that the achieved $E_b/N_t$ of the access terminal at the beam edge will be high enough to support the maximum modulation/coding rate and the same bandwidth efficiency as an access terminal in the center of the beam. Then, all access terminals transmitting in parallel using orthogonal Walsh codes will be transmitting at the maximum available modulation/coding (i.e., maximum bandwidth efficiency) which increases the overall beam bandwidth efficiency. Note that the access terminal at the beam center may transmit at higher power than 1/Lth of its maximum available transmit power and increase its modulation/coding rate beyond what would be possible in the TDMA case. Therefore, the bandwidth efficiency of the OCDMA system is higher than that of the TDMA system on the reservation channel.

As an example of how the bandwidth efficiency of OCDMA can be made higher than that of the TDMA system, consider a system where the $E_b/N_t$ at the beam center is X dB, and is X-3 dB at the beam edge. Suppose the data rate for an access terminal at the beam center is R, and is R/2 for an access terminal at the beam edge. For an equal grade of service scheduler where each access terminal is given enough time so that all access terminals achieve the same average data rate, the average throughput for the two access terminals will be R/1.5. Then the bandwidth efficiency of the TDMA system is (R/1.5)/W. Now consider an OCDMA system where the two access terminals at the beam center and the beam edge each get an orthogonal code of length 2. Then, if the access terminal at the beam edge transmits at the same power that the access terminal in the TDMA system does, the $E_b/N_t$ achieved for the OCDMA access terminal at the beam edge will be X dB because of the processing gain. If the access terminal at the beam center transmits at half the power that the access terminal in the TDMA system does, the $E_b/N_t$ of the access terminal in the beam center will also be X dB. Then, in the OCDMA system both access terminals can simultaneously transmit at the same bandwidth efficiency that the access terminal in the center of the beam in the TDMA system does. Then, the bandwidth efficiency of the OCDMA system in this example is R/W, which is 1.5 times that of the TDMA system. Note that in this example the peak rate of the OCDMA access terminals is lower than that of the TDMA system. The bandwidth efficiency of the OCDMA example described above could be further increased by allowing the access terminal at the beam center to also transmit at the maximum available power, in which case its achieved $E_b/N_t$ would be X+3 dB. Consequently, the access terminal could transmit at a rate greater than R (e.g., as high as 2R). Note that if orthogonal codes of a length larger than 2 are used, then the processing gain for each OCDMA access terminal will be even higher, resulting in higher achieved $E_b/N_t$ for the OCDMA access terminals. In such a circumstance, one can use a higher order constellation and code rate which, in turn, allows transmission at an even higher bandwidth efficiency in OCDMA systems in accordance with the present invention.

It is noted that there are limitations on the transmit power of an OCDMA terminal as well as on the size of the modulation constellation that can be used. As higher order modulation is used, more back-off is needed in the transmitted power of the amplifier due to the higher peak to average ratio of the modulation constellation. In one embodiment, the total transmit power from all OCDMA terminals on the uplink is limited to a threshold that does not exceed the allowable interference levels to an adjacent satellite.

Another advantage of CDMA is in its interference averaging capability. The data rate that an access terminal may transmit at on the return link depends on the $E_b/N_t$ that will be received from the access terminal at the gateway. In order to determine the data rate at which the access terminal may transmit, the gateway predicts the received $E_b/N_t$ from the access terminal and chooses the highest rate that can be correctly decoded at that $E_b/N_t$. The gateway informs the access terminal of the determined return link data rate. The received $E_b/N_t$ depends, of course, on the co-channel interference from access terminals that transmit simultaneously in co-channel beams. Therefore, in order to make an accurate prediction of the received $E_b/N_t$, one must be able to make an accurate prediction of the co-channel interference. In TDMA systems, however, the variance of the co-channel interference is usually large because there are a small number of TDMA co-channel interferers. Therefore, in order to ensure that the packet will be decoded correctly, a margin must be included in the $E_b/N_t$ prediction to account for the variance in the co-channel interference. In order to provide such a margin, a back-off in the achievable data rate is required, and a corresponding reduction in the throughput results therefrom. In CDMA system, due to statistical multiplexing of the large number of access terminals there will be an averaging of interference from different access terminals. Therefore, the variation in the interference will be smaller in CDMA systems. As a result, the back-off that is needed is smaller in the data rate in CDMA systems, which results, in turn, in higher capacity.

Allocating reservations to the access terminals for their return link transmissions increases the delay prior to data transmission due to the time required for the access terminal to send a reservation request message to the gateway and for the gateway to grant the request. This delay is particularly undesirable when sending short packets. In order to avoid this added delay, short messages may be transmitted on the random access channel without prior reservation. One common random access channel used is the TDMA based Aloha scheme. The disadvantage of the TDMA based Aloha scheme is its low spectral efficiency. Another random access scheme is CDMA based Aloha, which has higher bandwidth efficiency and lower delay than the TDMA based Aloha scheme. As will be described below, OCDMA may be designed to increase the bandwidth efficiency of the reservation based as well as the random access part of the return link. Next we describe a Statistically Multiplexed Reservation Channel as an alternative to a random access channel for sending short packets.

In an illustrative embodiment consistent with the present invention, a gateway assigns a code channel to each "active" access terminal on the statistically multiplexed reservation channel. As mentioned above the code channel is assigned to an active terminal for a specified time duration. The time duration may be predetermined or may be set to expire when the code channel has been inactive for more than a certain time interval. OCDMA may be efficiently configured to send short messages without requiring the access terminal to make explicit reservation requests from the gateway for return link bandwidth. If the access terminal has a short packet (e.g., an acknowledgement) to send, it will send the packet using its assigned Walsh code and will transmit at its predetermined power level and data rate. However, a source of inefficiency in this scheme results from the fact that a certain number of code channels are left idle. These idle code channels are present because the access terminal may not have any data to transmit for some time periods. However, if the access terminals that do transmit are allowed to transmit at higher power levels and with higher bandwidth efficiency, then statistical multiplexing may be used to provide increased bandwidth efficiency.

In one example of how the statistically multiplexed reservation channel would work, suppose there are a total of 2500 access terminals, and at a given point in time 10% of them are active. Then, one could assign a Walsh code of, for example, length 256 to each active access terminal. The modulation/coding scheme (and therefore the data rate) that the access terminal uses to transmit its data will depend on the amount of data it has to send. If it has little data to send it may choose a low data rate modulation/coding scheme and, therefore, transmit its data at a relatively low power level. Other access terminals that have more data to send will use a higher order modulation/coding and will transmit at higher power. In other words, each access terminal will adjust its data rate and power level according to its data rate requirement to achieve a certain delay.

Suppose x % of the access terminals will use their assigned time slots. Then, since during each time slot multiple access terminals are allowed to transmit using orthogonal codes, the actual amount of power that is generated by all access terminals in a beam on the return link will be about x % of the maximum possible transmit power. If the number of assigned orthogonal codes is L, then each terminal may transmit between the 1/L-th of its maximum available power to the maximum available power. Ideally, one would want the terminals to transmit at their maximum available transmit power. However, the total transmit power on the uplink from all transmitting terminals must not exceed a certain limit in order to not exceed interference levels to adjacent satellites. Another consideration for limiting the transmit power from each active terminal is the available power at the satellite on the downlink. One must ensure that that total transmit power from all active terminals does not exceed the transmit power limit available in the satellite on the downlink of the RL. If the average percentage of the code channels that are used is known, then one can make efficient use of the bandwidth by allowing the access terminals that do utilize their code channels to transmit at higher power and higher modulation/coding.

For instance, if half the access terminals are expected to use their assigned Walsh codes on average, then only half the power will be generated on the uplink of the return link. Therefore, we could allow each access terminal to transmit at double its nominal transmit power and at higher bandwidth efficiency. In this case, the fact that only half the access terminals use their Walsh codes does not result in a loss in bandwidth efficiency because the bandwidth efficiency of the access terminals is increased by allowing them to transmit at a higher power output and at a higher modulation/coding rate. This results in a statistical multiplexing gain that makes up for the unused code channels.

Note that the bandwidth efficiency of the OCDMA based statistically multiplexed reservation channel may be increased even further by allowing an access terminal to transmit at even higher power when the number of Walsh codes is large, for example, more than eight. Suppose there are eight Walsh codes assigned. Then each access terminal in the OCDMA system would take L times longer to send its data but would also send at 1/Lth the data rate for the same bandwidth efficiency. However, in this situation, each access terminal would be transmitting at a power output level that is 9 dB lower than the power output level required for a comparable TDMA access terminal. As discussed above, if each of the OCDMA access terminals are allowed to transmit at their maximum power, then the achieved $E_b/N_t$ for each access terminal on the return link would be 9 dB higher, which in turn would allow for a higher modulation/coding scheme and much higher bandwidth efficiency. Of course, there will be limits on the transmit power of OCDMA access terminals, and such limits may be determined by factors such as, but not limited to, the adjacent satellite interference, the downlink power available in the satellite on the return link, and the cumulative noise/inter-modulation interference generated by all the access terminals on the uplink.

FIG. 1 is a block diagram representation of a receiver for receiving a plurality of concurrent CDMA transmissions on the return link from a corresponding plurality of terminals. The receiver of FIG. 1 includes an antenna 102 coupled to a downconverter 104. The downconverter takes an RF signal and reduces the frequency. Various techniques for downconversion are known but are not described further herein. The output of the downconverter is coupled to an analog-to-digital (A/D) converter 106 which converts an analog signal to a corresponding signal in the digital domain. The output of A/D converter 106 is coupled to each of a plurality of despreaders 108a, 108b, 108n. There is no particular limit on the number of despreaders, although in some embodiments, the number of despreaders is equal to the number of code-modulated (i.e., CDMA) signals that a gateway may receive from access terminals in any particular time slot. A code source 110 is also coupled to each of despreaders 108a, 108b, 108n. Code source 110 provides the despreaders with the code needed to despread the incoming CDMA signals. The output terminal of each despreader 108a, 108b, 108n is coupled respectively to an input terminal and a data demodulator 112a, 112b, 112n.

This architecture is used because here because, in accordance with the present invention, a plurality of access terminals are transmitting OCDMA signals to the gateway in parallel.

Figure 2:
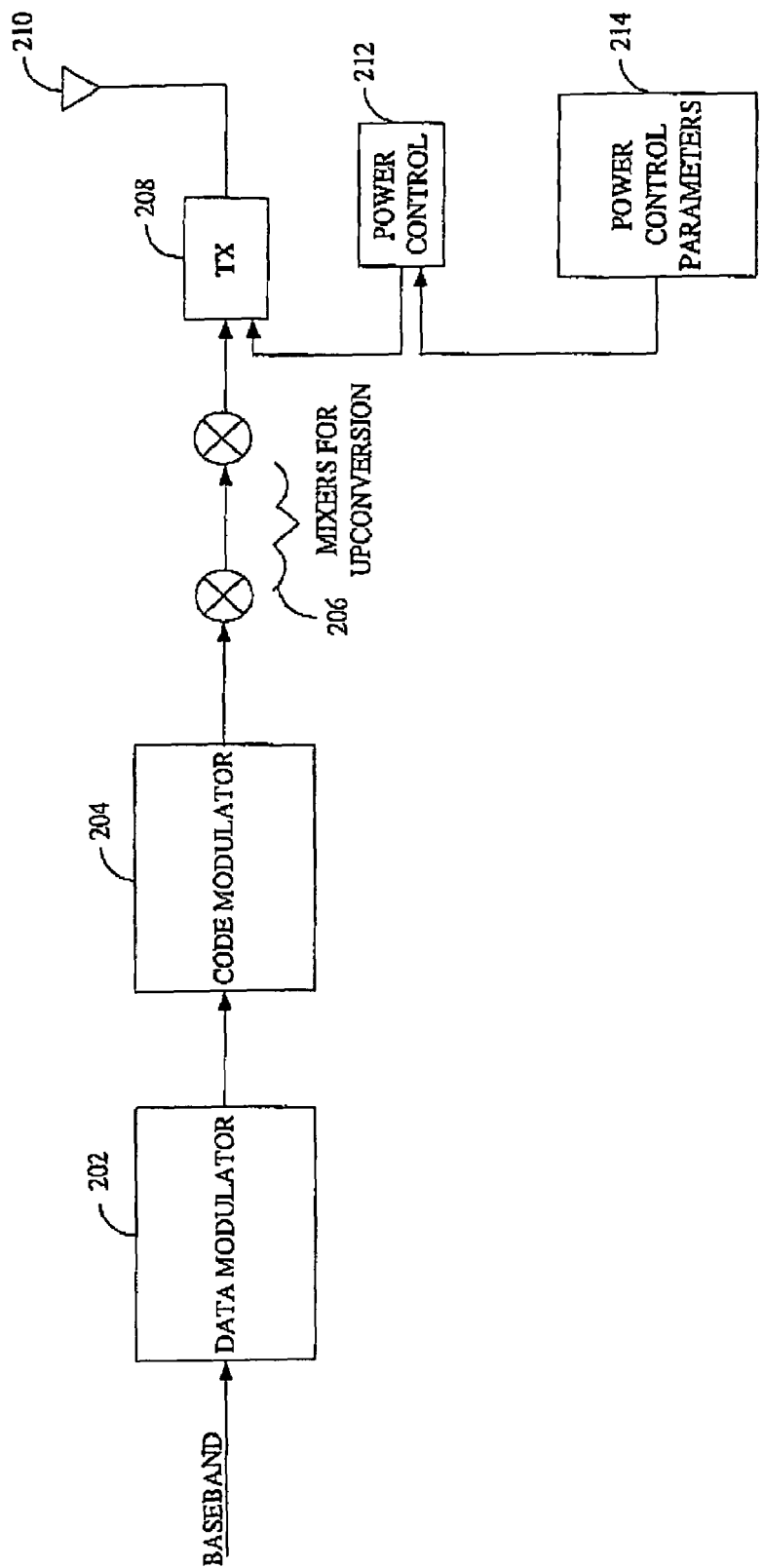
FIG. 2 is a block diagram representation of a transmitter in a terminal adapted to send messages on the return link of an OCDMA satellite communications system.

FIG. 2 is a block diagram representation of a transmitter in a terminal adapted to send messages in the return link of an OCDMA satellite communications system. In prior systems access terminals received CDMA signals from the gateway, but used TDMA to communicate in the return link. The transmitter shown in FIG. 2 is adapted not only to transmit CDMA signals but also to adjust its transmit power as described in detail above. This transmitter includes a data modulator 202 that modulates the baseband signal and a code modulator 204 that further modulates, in accordance with the code channel assigned to this particular access terminal, the signal to be transmitted. The output of code modulator 204 is upconverted by a series of mixers 206 in this illustrative example. Any suitable means of upconversion may be used. A final transmitter circuit 208 determines the transmit power in accordance with control signals received from a power control unit 212. Power control unit 212 is coupled to receive control information from the power control parameter storage unit 214. The transmitter power control is a function of the transmit power instruction received by the access terminal from the gateway, and of the access terminal's own determination of channel degradation effects. The terminal estimates any signal strength change on the FL, for instance due to fading caused by rain, by measuring the signal strength on the FL. Whenever there is a change in the signal strength on the FL, the terminal estimates the corresponding signal strength change on the RL and makes an adjustment to the data rate and/or the transmit power on the RL accordingly. In one embodiment, the terminal will use a calibration table to determine the RL signal strength changes based on the FL signal variation.

Figure 3:
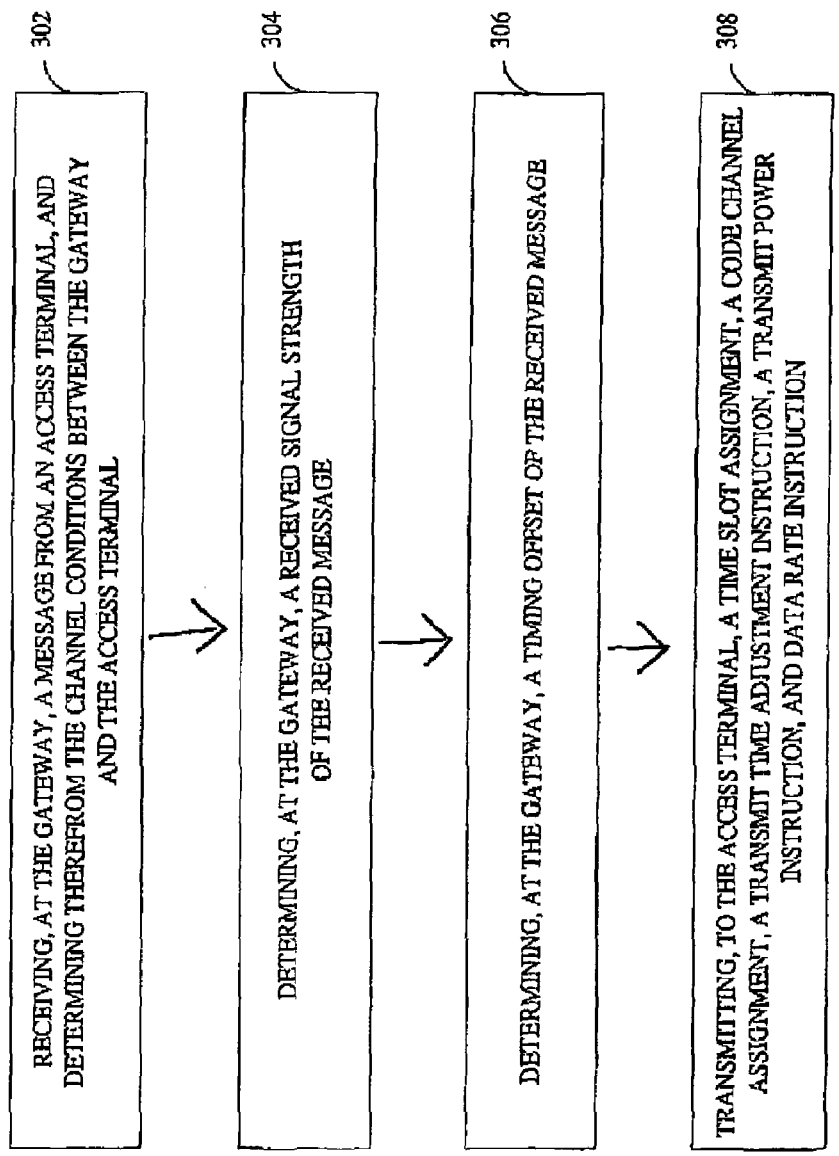
FIG. 3 is a flowchart of an illustrative process that shows operations of a gateway in accordance with the present invention.

FIG. 3 is a flowchart of an illustrative process that shows operations of a gateway in accordance with an embodiment. This illustrative process includes receiving in step 302, at the gateway, a message from an access terminal, and determining therefrom the channel conditions between the gateway and the access terminal. The access terminal may use any suitable means of contacting the gateway for this initial message. The method further includes determining in step 304, at the gateway, a received signal strength of the message received in step 302. An operation is also performed for determining in step 306, at the gateway, a timing offset of the received message. Determining this offset is one aspect of establishing OCDMA in the return link. The illustrative method further includes transmitting in step 308, to the access terminal, a time slot assignment, a code channel assignment, a transmit time adjustment instruction; a transmit power instruction, and a data rate instruction.

Figure 4:
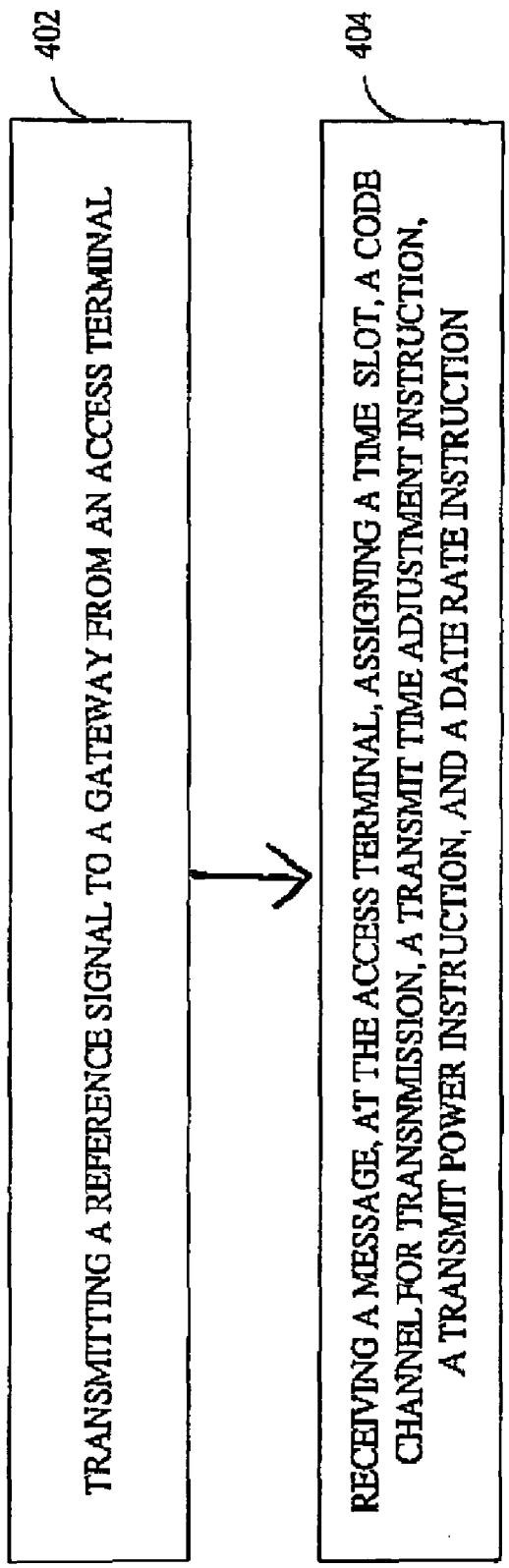
FIG. 4 is a flowchart of an illustrative process that shows operations of a terminal in accordance with the present invention.

FIG. 4 is a flowchart of an illustrative process that shows operations of a terminal in accordance with an embodiment. This illustrative process includes transmitting in step 402 a reference signal to a gateway from an access terminal. Subsequently, in accordance with the method of FIG. 4, the operation of receiving in step 404 a message, at the access terminal, assigning a time slot, a code channel for transmission, a transmit time adjustment instruction, a transmit power instruction, and a date rate instruction is performed. The time slot assignment informs the access terminal regarding the time or times at which it is to transmit, and the code channel instruction informs the access terminal as to how the transmitted data is to be coded for OCDMA. The transmit time adjustment instruction enables the access terminal to advance or retard its transmission time in order to maintain the required degree of code synchronism for OCDMA in the return link. The transmit power and data rate instructions inform the access terminal with respect to how it is to operate so as to achieve a desired effective data rate.

CONCLUSION

Methods and apparatus in accordance with the present invention utilize orthogonal CDMA in the return link of satellite communication systems to advantageously provide greater transmit power margins to compensate for channel degradation effects, such as rain fade. Similarly, embodiments of the present invention, by enabling higher bandwidth efficiencies, allow for access terminals which are displaced from a beam center to transmit at higher power levels which in turn permit higher order modulation schemes, which further in turn permits such a plurality of terminals within a beam to have the same average data rate regardless of their position relative to the beam center.

It is to be understood that the present invention is not limited to the embodiments described above, but encompasses any and all embodiments within the scope of the subjoined claims.

What is claimed is:

1. A method of operating L access terminals on a return link in a satellite communication system comprising:
    transmitting a reference signal from each access terminal to a satellite gateway;
    assigning a unique orthogonal Walsh code to each access terminal of the L access terminals, wherein each access terminal of the L access terminals repeats a data modulation symbol L times during the access terminal's assigned Walsh code interval to achieve a processing gain of L;

receiving a message at an access terminal from the satellite gateway, the message assigning a time slot for the return link, a code channel for transmission for the return link, a transmit time adjustment instruction for the return link, a transmit power instruction for the return link, and a data rate instruction for the return link; wherein the transmit power instruction is based on, at least in part, a location of the access terminal with respect to a beam center; wherein the time slot assignment informs the access terminal of the time or times at which it is to transmit; and wherein the transmit time adjustment instruction enables the access terminal to adjust its time slot assignment in order to maintain code synchronism for orthogonal code division multiple access (OCDMA) on the return link; and transmitting a Walsh code modulated message from the access terminal to the satellite gateway during a time slot specified by the time slot assignment, at a transmit power specified by the transmit power instruction, and at a data rate specified by the data rate instruction.

2. The method of claim 1, further comprising:

transmitting a message to the gateway indicating an amount of data that is to be transmitted from the access terminal on the return link, wherein the transmit power instruction is further based on, at least in part, the amount of data that is to be transmitted from the access terminal on the return link.

3. The method of claim 1, further comprising, prior to transmitting at least a portion of the amount of data that is to be transmitted on the return link, adjusting the transmit time so as to substantially achieve code synchronicity on the return link, code modulating a signal on the return link in accordance with the code channel assigned to the access terminal for the return link; transmitting at the transmit power level specified by the transmit power instruction; and transmitting on the return link, at least a portion of the amount of data that is to be transmitted on the return link.

4. The method of claim 3, further comprising detecting a degradation in channel conditions.

5. The method of claim 4, further comprising increasing transmit power to substantially compensate for the degradation in channel conditions.

6. The method of claim 5, wherein the degradation in channel conditions is substantially due to rain fade.

7. The method of claim 1, further comprising:

assigning the transmit power of each access terminal of the plurality of L access terminals to a value that is between at least 1/L of a maximum available transmit power and at most the maximum available transmit power.

8. The method of claim 1, further comprising:

achieving frequency synchronization between the access terminal and the satellite gateway based on, at least in part, the access terminal adjusting the frequency of its oscillator in order to lock to the frequency of the signal received from the gateway.

9. A method of operating a communication system utilizing L access terminals, comprising:

a) receiving, at a satellite gateway, a message from an access terminal, and determining therefrom the channel conditions between the satellite gateway and the access terminal;

b) determining, at the satellite gateway, a received signal strength of the received message;

c) determining, at the satellite gateway, a timing offset of the received message;

d) assigning a unique orthogonal Walsh code to each access terminal of the L access terminals, wherein each access terminal of the L access terminals repeats a data modulation symbol L times during the access terminal's assigned Walsh code interval to achieve a processing gain of L;

e) transmitting, to the access terminal, a time slot assignment for the return link, a code channel assignment for the return link, a transmit time adjustment instruction for the return link, a transmit power instruction for the return link, and a data rate instruction for the return link, wherein the transmit power instruction is based on, at least in part, a location of the access terminal with respect to a beam center; wherein the time slot assignment informs the access terminal of the time or times at which it is to transmit; and wherein the transmit time adjustment instruction enables the access terminal to adjust its time slot assignment in order to maintain code synchronism for orthogonal code division multiple access (OCDMA) on the return link; and f) transmitting a Walsh code modulated message from the access terminal to the satellite gateway during a time slot specified by the time slot assignment, at a transmit power specified by the transmit power instruction, and at a data rate specified by the data rate instruction.

10. The method of claim 9, further comprising repeating steps (a) through (f) for each of the L access terminals;

wherein the time slot assignment transmitted to each of the L access terminals is the same.

11. The method of claim 10, further comprising receiving, during the time slot specified by the time slot assignment, a plurality of code modulated messages.

12. The method of claim 11, further comprising despreading, in parallel, the plurality of code modulated messages.

13. A satellite gateway, comprising:

a code source coupled to at least one code modulator, and to a plurality of despreaders, wherein each despreader of the plurality of despreaders comprises a Walsh despreader, and wherein the code source comprises a source of orthogonal Walsh codes;

an upconverter coupled to the at least one code modulator, and further coupled to an antenna;

a downconverter coupled to the antenna, and further coupled to the plurality of despreaders;

a plurality of demodulators, each demodulator coupled to a corresponding one of the despreaders;

means for transmitting the following to each access terminal of L access terminals: a time slot assignment of the return link, a code channel assignment for the return link, a transmit time adjustment instruction for the return link, a transmit power instruction for the return link, and a data rate instruction for the return link; wherein the transmit power instruction is based on, at least in part, a location of the access terminal with respect to a beam center; wherein the time slot assignment informs the access terminal of the time or times at which it is to transmit; and wherein the transmit time adjustment instruction enables the access terminal to adjust its time slot assignment in order to maintain code synchronism for orthogonal code division multiple access on the return link;

means for assigning a unique orthogonal Walsh code to each access terminal of the L access terminals, wherein each access terminal of the L access terminals repeats a data modulation symbol L times during the access terminal's assigned Walsh code interval in order to achieve a processing gain of L; and means for transmitting a Walsh code modulated message from the access terminal to the satellite gateway during a time slot specified by the time slot assignment, at a transmit power specified by the transmit power instruction, and at a data rate specified by the data rate instruction.

14. A wireless communications access terminal, comprising:

means for transmitting a reference signal from L access terminals to a satellite gateway;

means for receiving, at each access terminal of the L access terminals, a message assigning a time slot for a return link, a code channel for transmission for the return link, a transmit time adjustment instruction for the return link, a transmit power instruction for the return link, and a data rate instruction for the return link, wherein the transmit power instruction is based on, at least in part, a location of the access terminal with respect to a beam center;

means for receiving, at each access terminal of the L access terminals, a message assigning a time slot for a return link, a code channel for transmission for the return link, a transmit time adjustment instruction for the return link, a transmit power instruction for the return link, and a data rate instruction for the return link, wherein the transmit power instruction is based on, at least in part, a location of the access terminal with respect to a beam center;

means for assigning a unique orthogonal Walsh code to each access terminal of the L access terminals, wherein each access terminal repeats a data modulation symbol L times during the access terminal's assigned Walsh code interval in order to achieve a processing gain of L;

means for transmitting a Walsh code modulated message from an access terminal of the L access terminals to the satellite gateway during a time slot specified by the time slot assignment, at a transmit power specified by the transmit power instruction, and at a data rate specified by the data rate instruction; and means for informing the access terminal, via the time slot assignment, of the time or times at which the access terminal is to transmit; wherein the transmit time adjustment instruction enables the access terminal to adjust its time slot assignment in order to maintain code synchronism for orthogonal code division multiple access on the return link.

15. The access terminal of claim 14, further comprising:

means for transmitting a message to the satellite gateway indicating an amount of data that is to be transmitted from the access terminal for the return link, wherein the transmit power instruction is further based on, at least in part, the amount of data that is to be transmitted from the access terminal for the return link.

16. The access terminal of claim 14, further comprising:

means for, prior to transmitting at least a portion of the amount of data that is to be transmitted on the return link, adjusting the transmit time so as to substantially achieve code synchronicity on the return link;

means for code modulating a signal on the return link in accordance with the code channel assigned to the access terminal;

means for transmitting on the return link, at the transmit power specified by the transmit power instruction; and means for transmitting on the return link, at least a portion of the amount of data that is to be transmitted on the return link.

17. The access terminal of claim 16, further comprising means for detecting a degradation in channel conditions.

18. The access terminal of claim 17, further comprising means for increasing transmit power to substantially compensate for the degradation in channel conditions.

19. The access terminal of claim 18, wherein the degradation in channel conditions is substantially due to rain fade.

20. A method comprising:

transmitting a reference signal from an access terminal of L access terminals to a satellite gateway via a return link of a satellite communication system;

assigning a unique orthogonal Walsh code to each access terminal of the L access terminals, wherein each access terminal of the L access terminals repeats a data modulation symbol L times during the access terminal's assigned Walsh code interval to achieve a processing gain of L;

receiving a message from the satellite gateway at the access terminal of the L access terminals, the message assigning a time slot for the return link, a code channel for transmission for the return link, a transmit time adjustment instruction for the return link, a transmit power instruction for the return link, and a data rate instruction for the return link; wherein the transmit power instruction is based on, at least in part, a location of the access terminal with respect to a beam center; wherein the data rate instruction is based on, at least in part, an energy per bit received on the code channel; wherein the time slot assignment informs the access terminal of the time or times at which it is to transmit; and wherein the transmit time adjustment instruction enables the access terminal to adjust its time slot assignment in order to maintain code synchronism for orthogonal code division multiple access on the return link; and transmitting a Walsh code modulated message from the access terminal to the satellite gateway during a time slot specified by the time slot assignment, at a transmit power specified by the transmit power instruction, and at a data rate specified by the data rate instruction.

21. The method of claim 20, further comprising:

limiting total transmit power from all access terminals of the L access terminals to less than or equal to an allowable interference between the satellite communication system and an adjacent satellite.

* * * * *

UNITED STATES PATENT AND TRADEMARK OFFICE
CERTIFICATE OF CORRECTION

PATENT NO. : 7,633,895 B2  Page 1 of 1
APPLICATION NO. : 10/428953
DATED : December 15, 2009
INVENTOR(S) : Schiff et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this

Twenty-first Day of December, 2010

David J. Kappos
*Director of the United States Patent and Trademark Office*